(12) United States Patent
Chesterman et al.

(10) Patent No.: US 6,664,539 B2
(45) Date of Patent: Dec. 16, 2003

(54) METHODS FOR EVALUATING GAMMA DETECTORS AND GAMMA DETECTOR INSTRUMENT RESPONSE, PARTICULARLY FOR USE IN INVESTIGATION EMISSIONS FROM SPENT NUCLEAR FUEL RODS

(75) Inventors: Andrew Stuart Chesterman, Calderbridge (GB); Alan Stanley Blundell, Calderbridge (GB); Nolan Howard Merrill, deceased, late of Millom (GB), by Lynda Elizabeth Merrill, administrator; Martin James Clapham, Calderbridge (GB); John Kenneth Sidney, Calderbridge (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 10/190,112
(22) Filed: Jul. 3, 2002

(65) Prior Publication Data

US 2003/0085347 A1 May 8, 2003

Related U.S. Application Data

(63) Continuation of application No. 09/614,325, filed on Jul. 12, 2000, now abandoned.

(30) Foreign Application Priority Data

Jul. 20, 1999 (GB) ............................................. 9916928

(51) Int. Cl.$^7$ ................................................. G01T 1/16
(52) U.S. Cl. .................. 250/252.1; 250/491.1
(58) Field of Search .......................... 250/491.1, 252.1, 250/494.1, 496.1, 362, 363.09, 371, 375, 459.1

(56) References Cited

U.S. PATENT DOCUMENTS

| 4,574,196 A | | 3/1986 | Kampf | |
|---|---|---|---|---|
| 4,647,420 A | * | 3/1987 | Bramblett et al. | 376/159 |
| 5,638,817 A | * | 6/1997 | Morgan et al. | 128/653.1 |
| 5,682,036 A | * | 10/1997 | Hines et al. | 250/363.09 |
| 5,689,116 A | * | 11/1997 | Jansen | 250/363.09 |

FOREIGN PATENT DOCUMENTS

| GB | 2 299 162 A | 9/1996 |
|---|---|---|
| JP | 56092484 A | 7/1981 |
| JP | 9236670 A | 9/1997 |

OTHER PUBLICATIONS

Goran af Ekenstam et al., *Independent Burnup Verification of BWR–Type Nuclear Fuel by Means of the $^{137}$Cs Activity*, Swedish Nuclear Power Inspectorate, Stockholm, Sweden, STUK–A52, Proceedings Jun. 1987.

J.R. Phillips et al., *Neutron Measurement Techniques for the Nondestructive Analysis of Irradiated Fuel Assemblies*, Los Alamos National Laboratory, Report 9002–MS, Nov. 1981.

S.T. Hsue et al, *Cooling–time Determination of Spent Fuel*, Los Alamos National Laboratory, 1979.

(List continued on next page.)

Primary Examiner—Constantine Hannaher
Assistant Examiner—Timothy Moran
(74) Attorney, Agent, or Firm—Workman Nydegger

(57) ABSTRACT

A method of investigating the response of an instrument to gamma emissions using a source package includes providing a source package on one side of a collimator including an aperture and a detector on the other side of the collimator relative to the source package, the collimator and detector positions defining an operating axis for the instrument. The position of the source package is then moved relative to the collimator. The response of the detector is measured for two or more of these different positions of the source package. The aperture in the collimator has a first dimension measured in a first direction perpendicular to the operating axis. The source package includes one or more individual gamma emitting sources provided in a container. During use, the individual source(s) have an overall extent in the first direction, the overall extent, during at least 10 seconds of use, being two or more times the first dimension of the collimator in that first direction.

34 Claims, 5 Drawing Sheets

OTHER PUBLICATIONS

T. Seino et al, *Present Status of Non–destructive Burn–up Measurement Techniques for Spent Fuel Assemblies*, Nippon Genshiryoku Gakkaishi (J. Atomic Energy SOC Japan), Orlean. 28, No. 8, pp. 736–745, 1986 and English translation.

L. Lakosi et al, *Spent Fuel Measurements at NPP Paks*, Esarda Bulletin 1986.

A. Hakansson et al., *Non–destructive Assay of Spent BWR Fuel with High–Resolution Gamma–ray Spectroscopy*, Uppsala University, Svedberg Laboratory and Department of Radiation Sciences, May 1995.

FAMOS Fuel Assembly Monitoring System, product information, NUKEM GmcH 1998.

R.I. Ewing, *Radiation Measurements to Qualify Spent Reactor Fuel for Loading into Burnup Credit Casks*, 33$^{rd}$ Annual Meeting proceedings, Institute of Nuclear Materials Management, Jul. 1992.

N.B. McLeod, *Overview of Spent Fuel Burnup Measurements*, Proceedings of 32$^{nd}$ Annual Meeting, Institute of Nuclear Materials Management, Jul. 1991.

SCN Brochure, *The Python Fuel Inspection System*, France, Jun. 1995.

Gerold G. Simon et al., *FAMOS—Measurement System for Assurance of Criticality Safety in Fuel Assembly Handling*, 1998.

H.O. Menlove, et al., *The Verification of Reactor Operating History Using the Fork Detector*, Institute of Nuclear Materials Management, 37$^{th}$ Annual Meeting, Naples, Florida, Jul. 1996.

Gerold G. Simon, *A Custom–Tailored FAMOS Burn–up Meter for VVER 440 Fuel Assemblies*, 1998.

S.T. Hsue, et al, *Design of a New Portable Fork Detector for Research Reactor Spent Fuel*, Los Alamos National Laboratories, Feb. 1995.

R. Carchon et al., *Ion 1/Fork Measurements on PWR Spent Fuel Assemblies*, International Symposium on Nuclear Material Safeguards, Vienna, Austria, Nov. 1986.

Andrew S. Chesterman, *Radiometric Instrumentation for Spent Fuel Monitoring*, EPRI/DOE/Industry Burnup Credit Workshop, Palo Alto, California, Jun. 17–18, 1998.

Andrew S. Chesterman, *Modular Stand Alone Spent Fuel Monitoring Systems Bring Significant Cost Savings in Storage, Transport and Disposal*, Proceedings of ICON 5: 5$^{th}$ International conference on Nuclear Engineering, Nice, France, May 1997.

Andrew S. Chesterman, *Spent Fuel Characterisation for Burnup Credit, Safeguards and Waste Disposal Applications*, ICEM '97, The Sixth International Conference on Radioactive Waste Management and Environmental Remediation, Singapore, Oct. 12–16, 1997.

Andrew S. Chesterman et al., *Spent Fuel and Residue Measurement Instrumentation at the Sellafield Nuclear Fuel Reprocessing Facility*, EPRI/DOE/Industry Burnup Credit Workshop, Palo Alto, California, Jun. 17–18, 1998.

Andrew S. Chesterman et al, *Radiometric Instrumentation for Burnup Credit, Safeguards and Waste Characterization of Spent Fuel*, EPRI/DOE/Industry Burnup Credit Workshop, Palo Alto, California, Jun. 17–18, 1998.

BNFL Instruments, *BNFL Instruments' Spent Fuel Monitoring Service*, EPRI/DOE/Industry Burnup Credit Workshop, Palo Alto, California, Jun. 17–18, 1998.

* cited by examiner

US 6,664,539 B2

METHODS FOR EVALUATING GAMMA DETECTORS AND GAMMA DETECTOR INSTRUMENT RESPONSE, PARTICULARLY FOR USE IN INVESTIGATION EMISSIONS FROM SPENT NUCLEAR FUEL RODS

CROSS-REFERENCE TO RELATED APPLICATIONS

The present application is a continuation of U.S. patent application Ser. No. 09/614,325, filed on Jul. 12, 2000, now abandoned which claims priority to United Kingdom Application No. 9916928.6, filed Jul. 20, 1999, which for purposes of disclosure are incorporated herein by specific reference.

BACKGROUND OF THE INVENTION

1. The Field of the Invention

This invention concerns improvements in and relating to verification and/or calibration, particularly, but not exclusively, to verification and/or calibration in relation to characterisation of spent nuclear fuel.

2. The Relevant Technology

Nuclear power generation involves, the provision of fuel assemblies containing enriched fuel to a reactor; the residence of that fuel assembly in the reactor, during which time the fissile material is consumed; and the removal of the fuel assembly after a period of time for subsequent handling. The subsequent handling may include reprocessing, to recover fissile material for subsequent use, and/or storage and/or transportation of the fuel.

In such subsequent tasks it is desirable for a number of reasons to have information on the characteristics of the fuel in the fuel assemblies.

A variety of instruments for monitoring such characteristics to varying degrees are known, including high resolution gamma spectrometry (HRGS), low resolution gamma spectrometry (LRGS) and passive neutron counting.

A variety of actual emission forms can be monitored to calculate the burnup of the fuel, either according to the level of that emission form or the interrelationship of two or more emission forms to one another.

A frequently monitored emission is based on curium emissions from the spent fuel. To achieve a detailed measurement of burnup, however, this measurement requires information on the original enrichment of the fuel as the curium based count is not only based on the burnup of the fuel, but also its starting enrichment.

BRIEF SUMMARY OF THE INVENTION

The present invention aims to provide a technique for accurately verifying the consistency of operation of an instrument for measuring burnup. The invention also aims to allow the claimed history for the fuel to be independently verified by comparing a model based evaluation of the claimed fuel history against the independent measured value. The provision of improved sources for calibration and/or modelling purposes and/or of calibration and/or verification test rigs is also an aim of the present invention.

According to a first aspect of the invention we provide a method of investigating the response of an instrument to gamma emissions using a source package, the method comprising:

providing a source package on one side of a collimator including an aperture and a detector on the other side of the collimator relative to the source package, the collimator and detector positions defining an operating axis for the instrument;

moving the position of the source package relative to the collimator, with the response of the detector being measured for two or more of those different positions of the source package;

an aperture in the collimator having a first dimension measured in a first direction perpendicular to the operating axis;

the source package comprises one or more individual gamma emitting sources provided in a container, in use the individual source(s) having an overall extent in the first direction, the overall extent, during at least 10 seconds of use, being two or more times the first dimension of the collimator in that first direction.

The operating axis may be thought of as the centre line of the field of view defined by the collimator or collimators and detector and/or an axis generally corresponding to the direction of travel of gamma emissions detected by the instrument.

According to a second aspect of the invention, we provide a source of gamma emissions, the source comprising one or more individual gamma emitting sources provided in a container, the individual source(s) have an overall extent in a first direction, that extent being greater than 10 mm.

The first and/or second aspect of the invention may include any one or more of the following features, options and possibilities.

Preferably the overall extent of the individual source(s) in the first direction is less than 50 mm, more preferably less than 30 mm.

The individual sources have an overall extent in a second direction, for at least 10 seconds in use, ideally perpendicular to the first direction. The second extent may be less than 20 mm and preferably less than 10 mm. Preferably the extent in the second direction is at least 1.5 mm and more preferably at least 2 mm. The second extent is preferably the same in all directions perpendicular to the first.

The first and/or second extent of the source package during the at least 10 seconds of use may be provided by the actual dimension of the source or sources in that direction. The extent of the source package during the at least 10 seconds of use may be provided by oscillating a source or sources through that extent, the source or sources having an actual dimension in that direction less that the extent. Preferably a frequency of oscillation of greater than 10 Hz is provided.

A plurality of individual sources may be provided in the container. The plurality of sources maybe a number greater than 5, greater than 10 or even 15 or more.

The gamma emissions from the individual sources are preferably of the same energy and/or same energies and/or same range of energies as are used by the instrument in its measurements.

Preferably each of the individual gamma sources is of the same type. Preferably each of the individual gamma sources emits the same gamma emissions, in terms of their energy energies or range of energies. The individual sources may be or contain $^{137}$Cs.

Preferably the level of emissions from each of the individual sources is substantially the same, for instance within 10% of one another. Preferably the level of emissions for an individual sources is substantially consistent from all directions, at least in all directions perpendicular to the axis on which the sources are aligned, for instance the second direction. Preferably the quantity of gamma emitter, ideally the quantity of the selected gamma emitter, such as $^{137}$Cs, will be sufficient to give a nominal equivalent activity of at least 5 mCi and/or a nominal equivalent activity of at most 40 mCi.

Preferably each of the individual gamma sources is substantially the same shape. Preferably the individual sources are cylindrical.

The individual source or sources may be provided with an end face at one or both ends of the extent in the first direction. One or both of the end faces of one or more, ideally all, the sources are preferably planar and/or parallel to one another. Preferably at least the outside end face of the individual source defining one end of the overall extent and the outside end face of the individual source defining the other end of the overall extent are parallel to one another, ideally, they are also perpendicular to the axis on which the sources are aligned. The axis is preferably the first direction. One, preferably both, of the end faces of one or more of the individual source(s) may be perpendicular to the axis of the source and/or the cylindrical surface thereof.

The individual source or sources may be provided with an effective side edge. The effective side edge may be defined by a face, but is more preferably the extent of the cylindrical surface of the source when viewed in from the side, for instance, perpendicular to the axis of the cylinder. One, preferably both of the effective side edges of one or more, ideally all, the individual sources are preferably linear and/or parallel to one another. Ideally, the effective side edges are aligned with one another, at least in the second direction. Preferably the effective side edges are parallel to the axis on which the individual sources are aligned. The axis is preferably the first direction.

The sources are preferably aligned on a common axis with one another.

The individual sources, for instance as cylinders, may be between 0.5 mm and 1.5 mm in length. The individual sources may be between 1 mm and 4 mm in diameter.

The container may be of stainless steel. Preferably the container is cylindrical. The end faces of the container are preferably parallel to one another. One, preferably both, of the end faces of the cylinder may be perpendicular to the axis of the cylinder and/or the cylindrical surface.

The container, for instance cylinder, may be between 10 mm and 30 mm in length. The cylinder may be between 5 mm and 25 mm in outside diameter.

The container may provide a bore in which the individual sources are received. Preferably the minimum internal cross-section measurement of the bore generally corresponds, for instance the same as or plus up to 2%, the maximum external cross-section measurement of the individual sources. The individual sources may have a cross-section which corresponds to the cross-section of the bore. The bore is preferably closed once the sources have been introduced. The closure may be of stainless steel.

Preferably the container provides a constant thickness of material between the individual sources and the outside of the container, for instance +/−15%, more preferably +/−5%. The thickness of the material may be 2 mm and 10 mm.

Preferably the container length and/or overall extent of the sources is at least twice the smaller of the height or width of the aperture in the collimator of the instrument in question. The height and width are generally those dimension substantially perpendicular to the direction in which gamma emissions pass through the collimator.

The position of the individual sources within the container is preferably fixed relative to the container. Preferably the position is fixed in the first direction and/or the second direction. The position may be fixed by cooperation of the sources with the container and/or with one another and/or packaging material provided within the container.

The source may be used in a method of checking instrument performance. The method may include determining the instrument's response to the source package, then conducting one or more investigative measurements on unknown samples and determining the instrument's response to the source package after those investigative measurements. A consistent response may be taken as indicative of consistent instrument performance during the measurements.

The source package and/or method of investigating an instrument's response may be used in a method of verifying information concerning materials. The method can comprise: providing an instrument, using the instrument to measure emissions from one or more radioactive sources within the material, the instrument producing signals upon detecting the emissions, the signals being processed to give a measured indication of a characteristic of the material The method can further comprise obtaining information about the history of the material, inputting at least some of that information to a modelling process, the modelling process generating a representation of the emissions from material having the inputted information, the representation of the emissions being applied to a further modelling process for the instrument, the further modelling process, at least in part using the source package and/or method of investigating an instrument's response, and producing a modelled indication of the characteristic of the material.

The method can yet further comprise comparing the measured indication of the characteristic and the modelled indication of the characteristic to verify the information inputted.

The source package and/or method of investigating an instrument's response may be used to model the effects of the field of view of the detector and/or variation in detection within the field of view.

The source during modelling and/or during checking of instrument performance may be moved relative to the field of view of the instrument. The source may be moved across the field of view from one side to the other. The one side may be above the other or vice versa. The one side may be to one side and/or the other side of the other horizontally.

The information to be verified may be one or more characteristics of the materials past or a characteristic derived therefrom, such as the burnup of the material and particularly the claimed burnup.

It is preferred that the emissions are measured by detecting gamma emissions using a collimated detector. The detected emissions are preferably converted to electrical signals and preferably fed to signal processing means. The signals preferably generate or correspond to a count rate, ideally for one emission form. Preferably the measured count rate is compared with a known relationship to give the measured indication of the characteristic.

The known relationship may be a linear relationship between count rate and the indication. The known relationship is preferably independent of the level of fissile material in the material initially.

The measured indication may be expressed as a burnup value.

The information about the history of the material may be obtained from the utility operator whose reactor the material has come from and/or the manufacturer of the material and/or the operator of the facility the material is stored in and/or the regulatory authority.

The modelling process may generate one or more factors providing the representation of the emissions arising from material having that history, preferably the emissions represented are the same emissions measured by the instrument. The representation may relate to the level of emissions arising from material having that history, for instance the escape probability for those emissions. The modelling process preferably produces an escape probability for $^{137}$Cs emissions, ideally 662 keV emissions.

The further modelling process preferably models the effects of the instrument on the representation of the emissions, for instance on the emissions themselves and most preferably the count rate arising from those emissions. The further modelling process may account for the level of emissions entering the instrument and/or the effect of the collimator and/or the effect of the detector and/or the effect of the signal processing means on the emissions modelled as being detected. The model may incorporate information on the response of the instrument to emissions, the information being generated by measuring the instrument's response to a source according to the present invention. The model may generate a count rate for the emissions and preferably generates an indication of the same characteristic as the measured indication of characteristic, based on the inputted history information. The modelled characteristic may be burnup.

The comparison may be a comparison of the measured characteristic's value and the modelled characteristic's value. The comparison may determine whether the values match and/or whether the values do not match. A match may be deemed to be a modelled value within a predetermined range of the measured value or vice versa.

A match between measured and modelled values may be taken as confirming the historical information for the material as being correct. A non-match between measured and modelled values may be taken as indicating a deviation in the actual history of the material from the inputted historical information. The deviation may occur in one or more of the components of the historical information.

According to a third aspect of the invention, we provide apparatus for checking instrument performance and/or for modelling instrument performance. The instrument comprises a detector to measure emissions from one or more radioactive sources within a source package, the detector producing signals upon detecting the emissions. The signals are fed to signal processing means, the signal processing means providing a measured indication of a characteristic of the source package, for instance a count.

The apparatus also includes a mount for holding the source and support means for the mount. The mount is moveable relative to the instrument in a first, preferably horizontal plane and/or in a second, preferably vertical plane and/or combinations thereof.

Preferably the support frame for the mount is mounted on the instrument in use, for instance on the collimator and/or casing thereof.

Preferably the movement of the source is affected by a motor, most preferably with the motor providing force to the mount holding the source so as to move the mount along a pre-defined path. Preferably the motor and/or mount for the source are computer controlled. This offers reproducible positioning of the source.

The third aspect of the invention may include any of the features, options or possibilities set out n the first aspect of the invention.

The first and/or second and/or third aspects of the invention may include any of the following features, options or possibilities.

The emissions may be neutrons, but are preferably gamma rays. The monitored emissions may be of an energy specific for one or more of the sources. The emissions may have an energy of between 100 and 2500 keV, for instance 630 and 690 keV, and more particularly, 662 keV.

The radioactive sources may be one or more isotopes emitting gamma rays and/or neutrons. Preferably the radioactive sources are gamma ray emitters. The radioactive sources may be fissile or fissionable isotopes present in new or recycled fuel, but are more preferably one or more fission products. It is particularly preferred that the radioactive source be a direct fission product of uranium and/plutonium, and more preferably a direct fission product which is yielded substantially equally from uranium and plutonium. The radioactive source may be $^{137}$Cs.

The material may be fresh or recycled nuclear fuel, but is more preferably nuclear fuel which has passed through a nuclear reactor. The instrument is particularly suited to monitoring spent nuclear fuel in the fuel rods and/or fuel rod assemblies in which the fuel was in the nuclear reactor.

The instrument may comprise an elongate element with the detecting location and/or collimator and/or material presentation location, and preferably all three, provided towards one end of that elongate element. The elongate element may be a hollow tube. The detector and/or detector assembly may be contained in the elongate element. The elongate element interior is preferably sealed against the environment surrounding the elongate element, particularly the further elongate element. The environment may be water. The elongate element interior is preferably open to the air, for instance above the water level of the environment. It is preferred that the elongate element provides a low radiation level environment within the elongate element in the vicinity of the detector and/or detector location. That low radiation level environment is preferably provided by the instrument within a high level radiation environment, for instance cooling water containing fuel rods.

In use, the elongate element is preferably introduced into a cooling pond or other liquid containing vessel in which the material to be monitored is present. Preferably the elongate element is substantially vertically aligned when deployed. The elongate element may be attached directly to the side of the cooling pond or vessel and/or indirectly mounted thereon.

The signal processing means may be provided separate from the elongate element and is preferably provided at least 5 m from the cooling pond or vessel containing the elongate element.

The signal processing means may convert the detector generated signals into a detector count and/or gamma spectrum. The signal processing means may convert the detector generated signals into a measurement of nuclear fuel burnup and/or cooling time and/or axial burnup profile. The signal processing means may be used to calculate a burnup credit, for instance via the calculation of burnup, from the detector generated signals. One or more of these processing steps may be conducted via the calculation of a count rate for the emissions based on the detector generator signals.

The signal processing means may comprise a computer, micro-processor or the like. The signal processing means may include data storage and/or manipulation and/or presentation capability.

The detector may be linked to the signal processing means via an electrical connection. The electrical connection may pass through the inside of the elongate element. Preferably the connection from the detector to the signal processing means passes into the detector assembly through the top of the detector assembly, that is the end opposing the supporting location engaging portion. The link to the detector is preferably electrically and/or electromagnetically isolated from the detector assembly.

Preferably the collimator is mounted inside a further element. Preferably the further element is elongate. The further element may extend perpendicularly from the elongate element. Most preferably, the further element extends perpendicularly from the elongate element. The further element is preferably provided at one end of the elongate element, i.e. within 5% of the overall length of the end of the elongate element.

The detector is preferably a high resolution gamma detector, for instance a high purity germanium detector. The detector may include a cryostat and liquid nitrogen coolant.

Preferably the collimator is elongate. The axis of the collimator preferably coincides with the axis of the further element. Preferably the axis of the collimator is perpendicular to the axis of the elongate element.

The collimator may be provided with one or more apertures. Preferably, the apertures define the field of view of the material presentation location from the detecting location and/or from the detector.

The material presentation location may be anywhere within the field of view of the detector, but is preferably adjacent to the end of the further element or in contact therewith. The end of the further element being the end distal from the detecting location. It is particularly preferred that at least part of the material be in contact with the further element during monitoring.

Preferably the detecting location, and collimator are provided within an enclosure sealed against liquids. A liquid impermeable, gamma ray transparent material is preferably provided between the material presentation location and the collimator.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
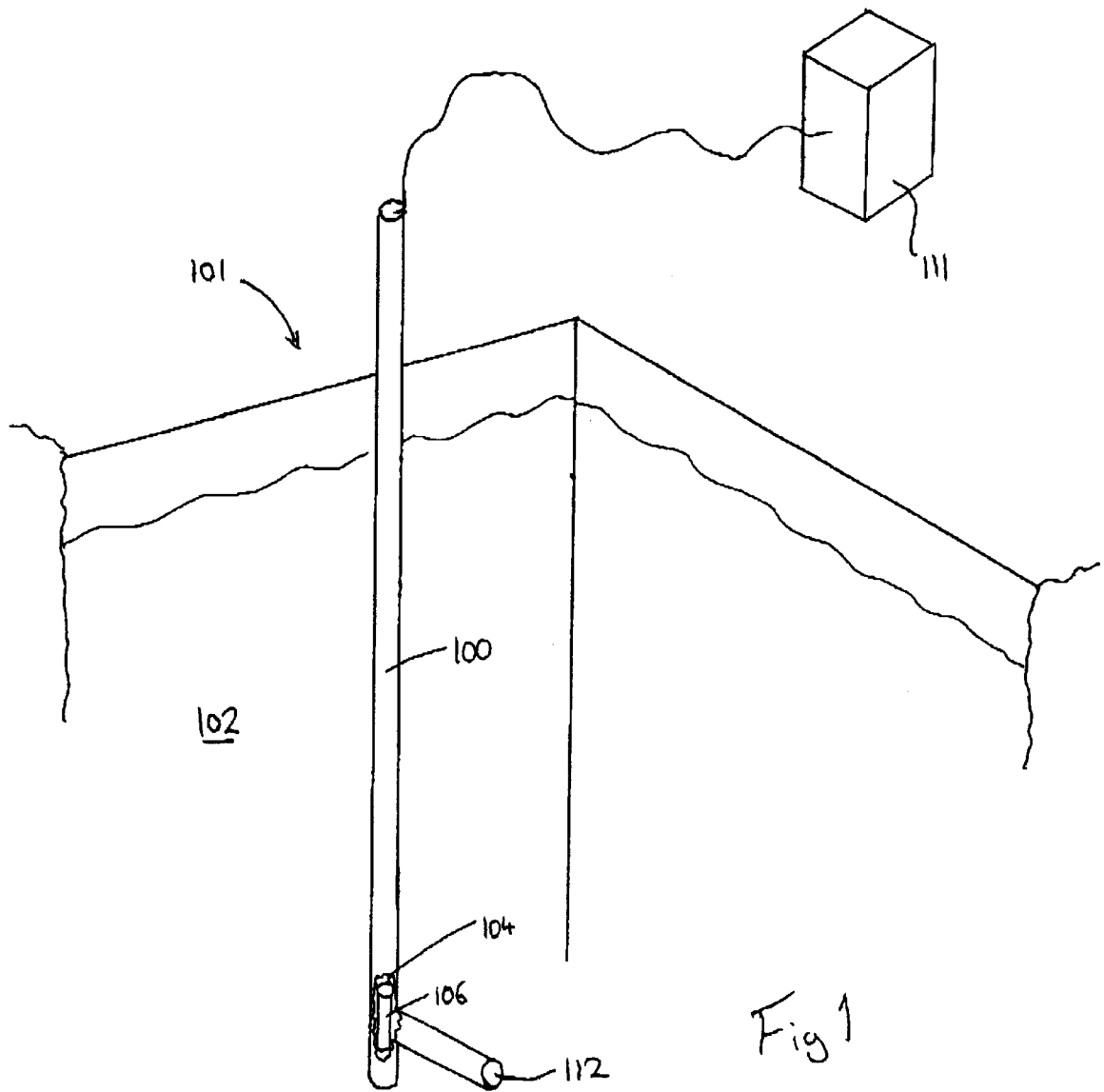
FIG. 1 is a schematic illustration of a spent fuel monitor deployed in a cooling pond.

The nuclear fuel cycle invariable produces spent fuel assemblies in which the level of the fissile materials is below the desired level, and which as a consequence need replacement to maintain the reactor in optimum condition.

Once removed from the reactor the fuel assembly is generally stored in a cooling pond before going on to further handling stages. The stages may include long term storage and/or transportation and/or reprocessing.

To assist in rendering this initial storage and subsequent handling as commercial as possible, whilst maintaining utmost safety, it is desirable to establish accurate characterisation of the used fuel. Characterisation is, for instance, desirable for safeguard purposes (such as fissile material level determinations), for process control purposes (such as selecting suitable used fuel for feed to reprocessing operations) and for optimising storage, transport and disposal situations (such as through the application of burnup credit).

The potential to apply burnup credit to storage, transport and disposal situations is commercially attractive.

The assumptions required by safety regulators currently require the packing density of fuel assemblies and the level of neutron absorbers provided to be that which would be safe for the fuel assembly, assuming the assembly still contained its original enriched level of fuel, that is the level at the time of its production.

Invariable during its time in the reactor a fuel assembly under goes a reduction in its neutron multiplication reactivity through the consumption of fissile and fissionable materials and the generation of fission product neutron poisons. This means that the packing density of the spent fuel assemblies could be greater and/or the level of neutron absorbers reduced in subsequent stages, if this reduction (referred to as "burnup credit") could be allowed for to the satisfaction of the regulatory authorities. The potential for greater packing densities to be used also opens up the possibility of re-racking existing storage configurations with the assemblies closer to one another.

Various proposals for applying burnup credit have been suggested. One such proposal involves a computer software based calculation of the isotopic makeup of the spent fuel, a computer software based prediction of the sub-critical multiplication factor, determination of bounding conditions from criticality calculations and the use of these factors to design criteria controlling storage, transport and disposal. In such a case, and with the other proposals, independent validation of the materials entering this process must be provided. This last stage requires accurate reactivity determinations for the fuel.

Actual measurement based validation can also be used to confirm that the reactor history for the fuel fed into the computer calculations is correct and to ensure that the resulting packing etc is fully compliant with the design criteria.

The need for accurate determinations also arises in other areas, such as:

1. verification of spent fuel stocks, where initial measurements and subsequent verifications are needed to ensure the location of plutonium and other materials of spent fuel;

2. improved determinations of material levels to assist in transport and disposal decisions and safeguards information;
3. waste monitoring, where measurement of and confirmation of the radionuclide content of the spent fuel may be needed during its storage after disposal or during its long term storage pending a further handling decision;
4. process control, such as reprocessing facilities where it is necessary to ensure that the feed materials selected at a given time meet the requirements of the process flowsheet for efficient handling.

The applicant has designed an instrument suitable for measurement of a variety of characteristics of spent fuel, as illustrated schematically in FIG. 1.

The instrument is intended for use in a cooling pond containing the fuel assemblies to be measured. The vertical tube 100 is mounted to the wall 101 of the cooling pond 102 (although the instrument is also suited to investigation for dry systems) and provides a detector containing chamber 104 towards the end of the tube 100 which is submerged. The detector chamber 104 houses a gamma detector which is shielded so as to cut out as much as possible of the background radiation. The shielding surrounds the detector and extends via the tube 100. The tube 100 also provides the mount for a horizontal tube 108 which contains a collimator for the detector 106. Signals generated by detection of the emissions are conveyed from the detector 106 to signal processing unit 111 outside of the cooling pond. The tube 108 is provided with a V-shaped recess 112 at its end, the notch 112 receiving the fuel in use.

Through the use of a gamma detector attuned to monitor 662 keV gamma emissions, characteristic of $^{137}$Cs, burnup can be measured. $^{137}$Cs has a linear relationship with burnup in spent fuel, as $^{137}$Cs is a direct fission product and has an almost equal fission yield from uranium and plutonium. In addition, as $^{137}$Cs has a half life of 30 years, its level is not prone to significant errors due to inaccuracies in the cooling time recorded between discharge of the fuel from the reactor and the time of measurement. Additionally, this half life means that the level is insensitive to variations in reactor power rating and/or dwell time.

The linear relationship is:

$$^{137}Cs = a + b.BU$$

where $^{137}$Cs is the count rate of the 662 keV gamma ray corrected to zero cooling time, a and b are constants in the linear correlation with burnup and BU is the burnup measured in MWd/Te(U).

Other emissions or interrelationships can be used to monitor the fuel.

Figure 2:
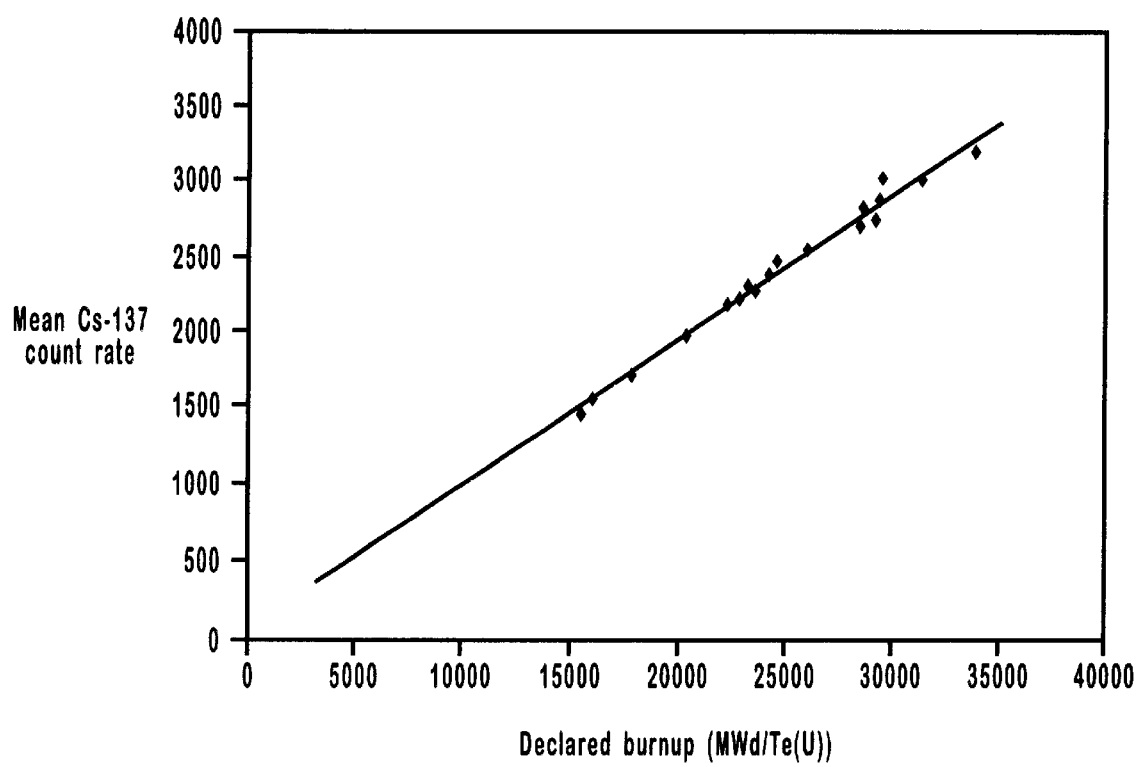
FIG. 2 illustrates a plot of measured $^{137}$Cs count rates using an instrument according to FIG. 1 against declared burnup for a number of known fuel samples.

The value of the constants a, b, can be obtained by conducting measurements using an instrument as illustrated in FIG. 1 to measure burnup for a significant number of fuel assemblies whose history is fully verified and for which declared burnups can be calculated as a result. The resulting linear plot of this type of process is illustrated in FIG. 2.

Figure 3:
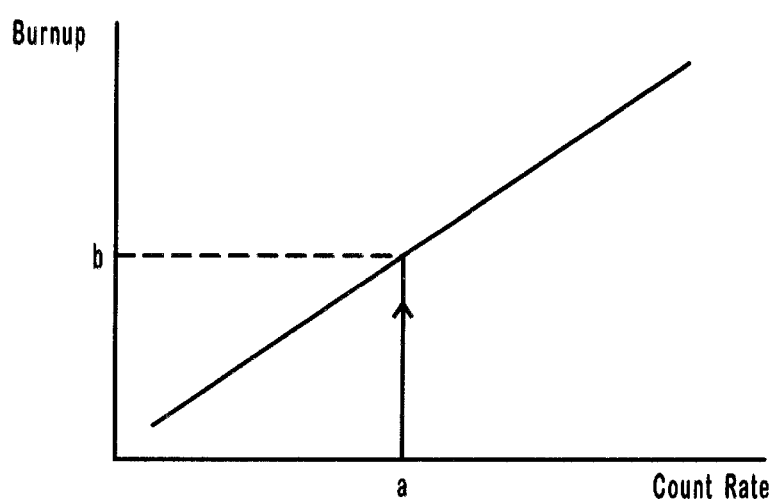
FIG. 3 illustrates a plot of the interrelationship between count rate and burnup used to obtain measured burnups from the $^{137}$Cs count rate.

Once this linear relationship has been determined, the plot of FIG. 3 can be made to allow measured burnups to be determined from further measured $^{137}$Cs count rates of unknown spent fuels. Using this plot, the count rate obtained, a, is projected on to the line to give measured burnup value b.

The measured value obtained gives a direct reading of measured burnup without having to feed into the calculation any historical information relating to the fuel assembly.

Thus, there is no need to rely on information from third parties concerning the initial enrichment of the fuel forming the fuel assembly, the fuel assemblies reactor history or other such variables. This is important in providing confirmation that the claimed burnup is true from a regulatory point of view as it is not reliant on information outside the regulator's control.

The measured values can be compared with the utility operator's declared burnup for the fuel in question. In order to be able to confirm that any deviations between these two values which occur are due to the history differing, rather than any variation in the instrument's operation, calibration checks can be performed on the instrument.

The calibration checks are also independent of the utility operator as they are performed by the instrument operator and use a highly characterised and consistent source. By performing calibration checks before and after the actual measurements, the fact that the instrument responses in those calibration checks in a consistent manner confirms the consistent operation of the instrument during the actual measurements. Additional checks using a standard source may be interspersed between batches of runs on unknown spent fuel samples or even between individual spent fuel samples. In this way, a full check against periodic or one off variations within the instrument's performance can be provided. Consistency of the field of view of the instrument and the response of the instrument to emissions arising from different positions within that field of view are potential variables which are eliminated in such checks.

A calibration assembly useful for such checks is described in more detail below.

The independence of this measurement can be used to take verification to a further level based on the fact that the measured burnup for a fuel assembly can be fully independently measured. The further investigation compares the measured burnup value with a highly accurate model based calculation of the burnup value. These two result obtaining processes and the comparison of the results are illustrated in FIG. 4.

Figure 4:
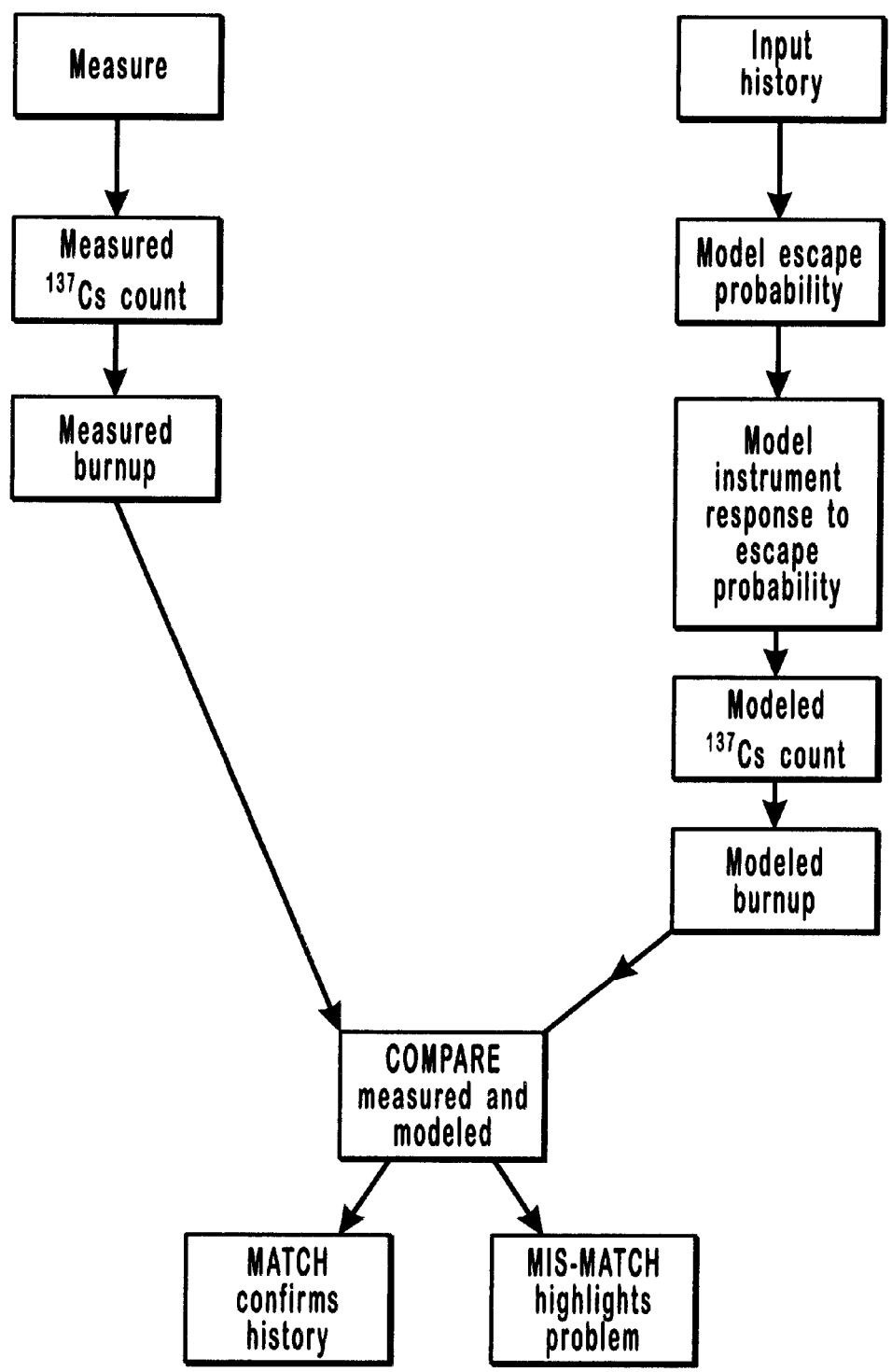
FIG. 4 schematically illustrates the comparison and verification of burnup based on history and burnup based on measurement.

The process flow of the left hand side of FIG. 4 illustrates the type of measurement and calculation described above. Thus, a measurement of the spent fuel is conducted to generate a $^{137}$Cs count rate. This count rate is compared with the plotted correlation to calculate a measured burnup for the spent fuel. This forms one input to the comparison stage.

In the separate process of the right hand side of FIG. 4, the recorded history for the spent fuel under consideration, as measured above, is provided by the utility operator whose fuel it is or by the regulatory authority that keeps the record of their operations. This history includes the initial enrichment of the fuel, the duration the fuel has been in the reactor, the operating conditions of the reactor, the fuel's position in the reactor and other reactor history factors.

This historical information is used in the subsequent stage to produce $^{137}$Cs per unit mass value and/or an escape probability for $^{137}$Cs gamma rays from that fuel using sophisticated modelling techniques, such as Monte Carlo modelling. This part of the modelling process gives an accurate model of the $^{137}$Cs output of spent fuel having that history and accounts for the geometry of the particular fuel assembly type.

In the next stage, the proportion of $^{137}$Cs gammas entering the instrument of the type set out in FIG. 1 is calculated and an evaluation performed upon the subsequent interaction of those gammas with the instrument to give a modelled $^{137}$Cs gamma count for the instrument. The properties of the collimator, detector and other components of the instruments are known to a great degree of accuracy and consistency so as to enable this modelling process to be performed. An integral part of the accuracy of this modelling is the source used in the investigation for the modelling, discussed in more detail below.

Once the behaviour of the instrument, known to very high tolerances, has given an accurate, modelled, $^{137}$Cs count for fuel with the modelled history, this count can then be translated into a burnup value according to the type of plot illustrated in FIG. 3. This is the modelled burnup value.

The measured burnup and modelled burnup values can then be compared with one another in the next stage. A match between the two, within certain pre-defined thresholds, confirms the history claimed for the spent fuel as being accurate.

The only variable for the modelling process is the historical information. Examples of burnup computer codes that can be used in the modelling process include: FISSPIN (see R. F. Buirstall FISSPIN—A computer code for nuclide inventory calculations, UKAEA, ND-R/328(R) October 1979) and ORIGEN'S (a scale 4.2 module that performs isotopic generation and depletion calculations for a specified reactor fuel history, ORIGEN'S being called by the SAS2H analysis sequence of the scale 4.2 module). Significantly both codes agree fully with $^{137}$Cs based calculations for burnup. Thus discrepancies in the model will not arise from this stage.

Similarly the accuracy with which the instrument's behaviour is determined prevent discrepancies arising from that source part of the process.

As the modelled value depends solely for its result on the history inputted, the computer codes and instrument performance not introducing any variables, the technique thus offers totally independent verification of the position claimed by the utility operator.

A lack of a match between the two values indicates a deviation between the actual history of the spent fuel and the claimed history. This could alert the utility operator to potential variations in the reactor and/or fuel's actual performance and operation and/or alert the regulatory authorities to deviations in the actual and claimed histories for spent fuel.

Whether a match occurs or not is totally independent of the utility operator's control, as the measured value does not rely on any input from them. Additionally, the modelling is performed independently of the utility operator and is established to the regulators approval as giving results purely dependant on the history input. As a consequence, full independence of the verification of the utility operators records, to go with the fully independent measurement, is provided in a manner which should be highly acceptable to the regulatory body to be satisfied.

As discussed above, in order to be able to verify consistency of operation calibration checks are periodically performed on the instrument. To ensure these checks are consistent in themselves over time it is important to use a consistent source.

More importantly, accurate modelling of the instrument is needed for the model based side of the comparison process discussed above.

For both these tasks, particularly the second, the source needs to be easily useable (in terms of size, for instance), capable of consistent positioning in a variety of positions without introducing variations itself and provide clear variation in the signal arising when it passes into and out of the instrument's field of view. A significant aspect of the modelling considerations is the variation in the instrument's response to emissions arising from various positions within its field of view and being able to determine the actual field of view of the instrument.

The provision of such a source using a point source, the existing technique, has been determined to be impractical due to any useable source being too large to act as a true point source and susceptible to positional variations of unknown and unquantifiable levels.

To achieve a suitable source the applicant has developed a source package of a significantly different type. The source is of a very different size, configuration and overall approach that a point source aimed at similar investigations.

Figure 5:
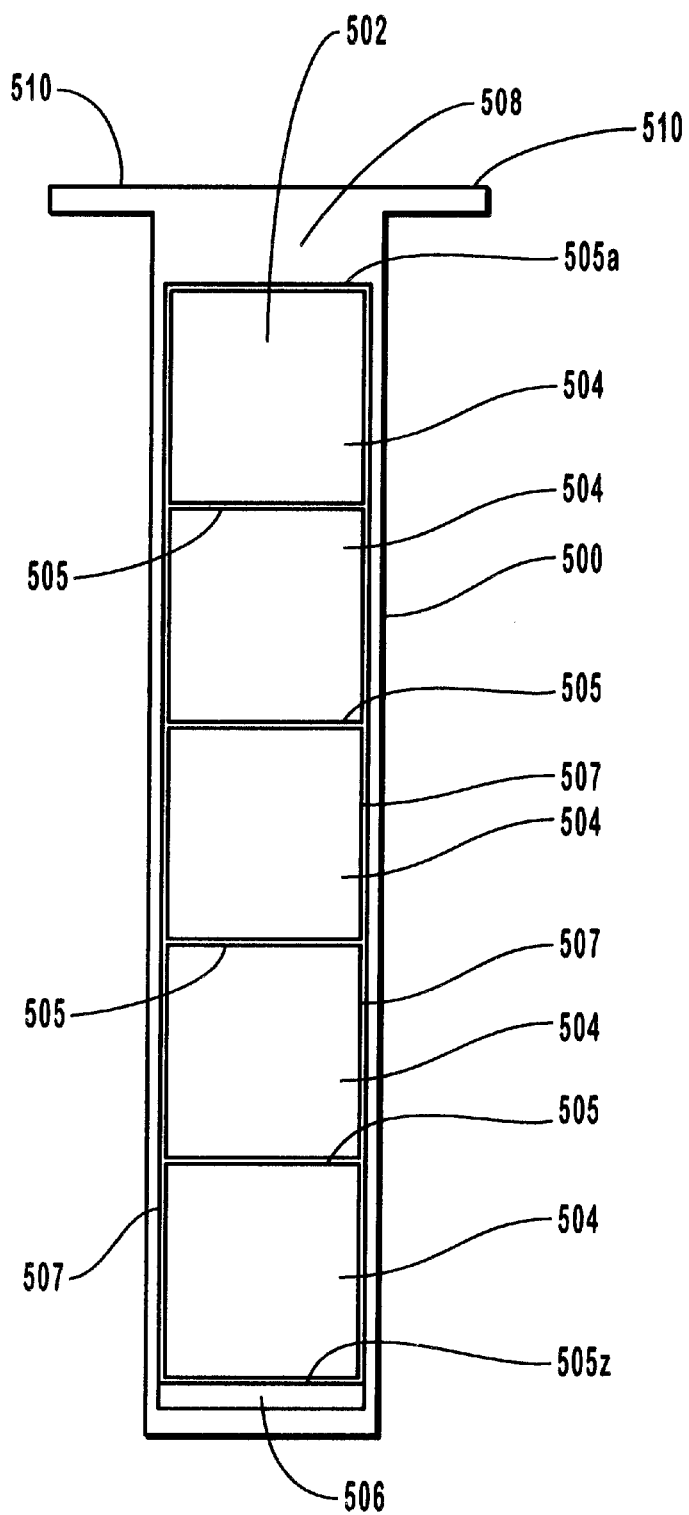
FIG. 5 illustrates a source package for determining instrument behaviour.

According to one embodiment of the invention, the source package is a line source, for instance as illustrated in FIG. 5.

The source package consists of a cylindrical body 500 with an axially aligned bore 502. A number of separate cylindrical emission sources 504 are provided in the bore 502 at consistent positions a consistent manner. The positions of the sources 504 are fixed by the close match of their abutting surfaces and the walls of the body 500, with a packing element 506 eliminating any movement. The packing element 506 ensure, in particular, that there is no axial movement of the sources 504 within the bore 502, either relative to one another or relative to the body 500. The fit between the sources 504 and bore 502, supplemented by packing material if needed, ensures that there is no lateral movement of the sources 504.

The sources 504 feature flat upper and lower surfaces 505 which are parallel to one another and at right angles to the central axis of the cylindrical sources 504. The cylindrical source's diameter is consistent throughout and thus provides a consistent straight side edge 507 when viewed from the side of the package in any direction. The configuration of these edges 505, 507 is important in the source's performance during its intended tasks.

The cap portion 508 which seals the sources 504 within the bore 502 is provided with a flange 510 to assist in the mounting of the source package during use.

To maximise the determination of the instrument's response a very closely specified source package is desirable. The length measured between the end face 505a of source 504 at one end of the package relative to the face 505z of the source 504 at the other end of the package is 12 mm, with the sources 504 having a diameter of 3.18 mm.

The individual sources 504 themselves are equivalent to one another within +/−5% in terms of their length and diameter and the end surfaces are parallel to one another +/−5%. It is also important that the source activity of each of the sources 504 be accurately balanced and the activities are preferably the same as one another +/−5%.

The overall activity of the package is determined by the quantity of $^{137}$Cs present, and should be sufficient to give nominally equivalent activity of 15 mCi (555 MBq). The activity of each of the sources 504 is not only evenly distributed within that source, but that activity measured from any point around the cylindrical surface in particular and preferably in any direction, is also equivalent +/−5%, more ideally +/−1%. In this way, rotation of the source does not effect its output.

The stainless steel container for the sources 504 protects the sources and maintains them sealed when in use and reduces the contact dose to acceptable levels.

Preferably the Cs$^{137}$ is present without any other significant isotopes being present within the sources.

Figure 6:
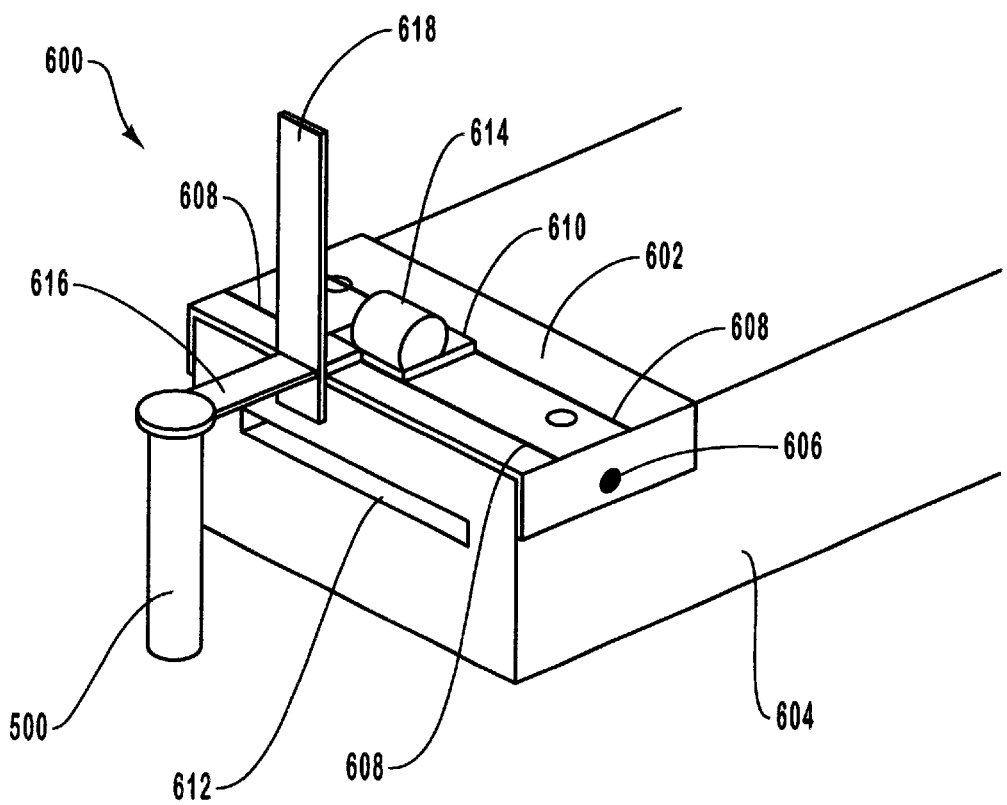
FIG. 6 illustrates a test rig mounted on a collimator for use in the modelling and/or calibrating process.

To perform the instrument's calibrations and/or to investigate it from modelling purposes the invention provides a test rig which provides a mount for the source, the rig itself mounting on the front of the instrument's collimator in a standard position, as shown in FIG. 6.

The mounting assembly 600 includes a bracket 602 for mounting the assembly on the collimator tube 604 with fixings 606 which fix the bracket 602 to the collimator tube 604 in a standard position. The bracket 602 top surface provides fixed track routes 608 along which component 610 can be moved to provide horizontal scanning of the source package 500 relative to the aperture 612 in the end of the collimator tube 604. Movement is affected through a motor 614. Vertical movement is achieved by the motor driving movement of bracket 616 which moves the source up or down the vertical element 618. Mounting in this way allows the source to be moved across the front of the collimator horizontally and/or vertically. The position of the source relative to the collimator in both dimensions is monitored accurately using accurate position information provided by the test rig so that the response and source position can be tied together.

During a test the source is moved from one position to a slightly different position and allowed to rest there whilst a sufficient count is achieved, (a minute or two), and is then moved on a step to the next position with the process being repeated until the full scan has been completed. Horizontal steps of less than 1 mm are performed. Vertical steps of less than 0.1 mm are performed. The activity in view at any one stage is preferably around 5 mCi.

Figure 7:
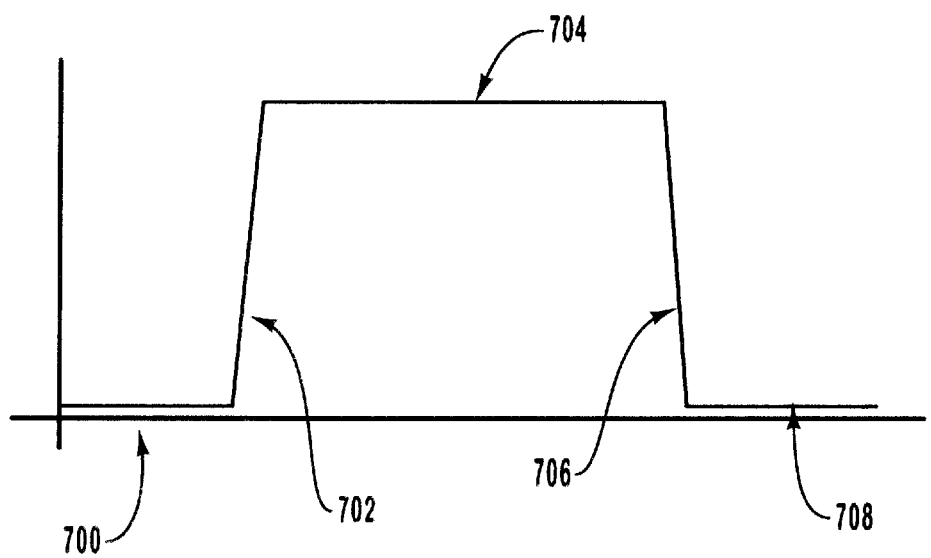
FIG. 7 illustrates a plot of instrument count rate with source package position using the source package of FIG. 5.

FIG. 7 illustrates the type of response measured by the instrument as the source is brought across its front from one side to the other. Thus the count rate starts very low, portion 700, when the source is out of the field of view of the detector through the collimator. The count rapidly increases as apparent edge 507 of the source comes into view and then increases further as the source more fully comes into view, portion 702. The count rate then stays level, portion 704, with the source fully in view, before tailing off again 706, as it disappears from view, back to the background level 708.

The fact that the source's active length, approximately 12 mm, is substantially greater than the aperture height, approximately 3 mm, means that vertical movement of the source relative to the detector during a horizontal scan test is irrelevant as the amount of source in view is not effected. This would be a significant, but unquantifiable problem with a point source.

A similar investigation can be conducted by scanning the source vertically. Once again, there is a background count until the top edge 505a of the first active source 504 comes up into view, sharply increasing count rate as the amount of source in view increases with a level count whilst the amount of source in view does not vary followed by a drop off back to the background count when the lower edge 505z of the active sources passes out of the field of view.

Results of the type illustrated in FIG. 7 can be used to confirm that the particular instrument is still functioning as it previously has; the same counts with the same source with the same position. The results can also be used in the modelling process detailed above to determine what happens to the model generated emissions on entering the instrument.

Although technically more awkward it is possible to generate a line source by rapidly oscillating a point source perpendicular to the direction of movement of interest. Thus a vertically oscillating point source can be moved across the front of the instrument to give a similar investigation to that of FIG. 7.

Thus, the present invention offers a technique whereby accurate source based calibration and modelling can be performed for very fine apertures for which point sources are neither technically or commercially practical.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of investigating the response of an instrument to gamma emissions using a source package, the method comprising:
   providing a source package on one side of a collimator including an aperture and a detector on the other side of the collimator relative to the source package, the collimator and detector positions defining an operating axis for the instrument;
   moving the position of the source package relative to the collimator, with the response of the detector being measured for two or more of those different positions of the source package;
   an aperture in the collimator having a first dimension measured in a first direction perpendicular to the operating axis;
   the source package comprises one or more individual gamma emitting sources provided in a container, in use the individual source(s) having an overall extent in the first direction, the overall extent, during at least 10 seconds of use, being two or more times the first dimension of the collimator in that first direction.

2. A method according to claim 1 in which the individual sources have an overall extent in a second direction over a period of at least 10 seconds during use.

3. A method according to claim 2 in which the second extent is less than one half the second dimension of the collimator in that second direction.

4. A method according to claim 1 in which the first and/or second extent of the source package during the at least 10 seconds of use is provided by the actual dimension of the source or sources in that direction.

5. A method according to claim 1 in which the extent of the source package during the at least 10 seconds of use is provided by oscillating a source or sources through that extent, the source or sources having an actual dimension in that direction less that the extent.

6. A method according to claim 1 wherein the source includes a plurality of individual sources provided in the container, the plurality of sources being a number greater than 10.

7. A method according to claim 1 in which each of the individual gamma sources emits the same gamma emissions, in terms of their energy, energies, or range of energies.

8. A method according to claim 1 in which the level of emissions from each of the individual sources is within 10% of one another.

9. A method according to claim 1 in which the level of emissions for the one or more individual gamma emitting sources is substantially consistent from all directions, at least in all directions perpendicular to the axis on which the sources are aligned.

10. A method according to claim 1 in which the individual source or sources are provided with an end face at both ends of the extent in the first direction, one or both of the end faces of one or more the sources being planar and/or parallel to one another.

11. A method according to claim 1 in which both of the end faces of one or more of the individual source(s) are perpendicular to the axis of the source and/or the cylindrical surface thereof.

12. Apparatus for checking instrument performance and/or for modelling instrument performance, the instrument comprising a detector to measure emissions from one or more radioactive sources within a source package, the detector producing signals upon detecting the emissions, the signals being fed to a signal processor, the signal processor providing a measured indication of a characteristic of the source package;

the apparatus comprising a mount for holding the source and means for supporting the mount, the mount being moveable relative to the instrument in a first plane and/or in a second plane and/or combinations thereof.

13. An apparatus as recited in claim 12, wherein the measured indication provided by the signal processor is a count.

14. An apparatus as recited in claim 12, wherein the first plane is horizontal and the second plane is vertical.

15. A method of investigating the response of an instrument to gamma emissions using a gamma source package, the method comprising:

providing a source package on one side of a collimator including an aperture and providing a detector on the other side of the collimator relative to the source package, the collimator and detector positions defining an operating axis for the instrument;

moving the position of the source package relative to the collimator with the response of the detector being measured for two or more of those different positions of the source package, the gamma emissions which generate the measured response passing through a single aperture in the collimator to reach the detector;

the aperture in the collimator having a first dimension measured in a first direction perpendicular to the operating axis; and the source package comprising one or more individual gamma emitting sources provided in a container, during a measurement of response at a position, the individual source(s) having a maximum extent in the first direction, the maximum extent, during at least 10 seconds of use, being two or more times the first dimension of the aperture in that first direction.

16. A method according to claim 15 in which the individual sources have a maximum extent in a second direction over a period of at least 10 seconds during use.

17. A method according to claim 16 in which the second extent is less than one half the second dimension of the collimator in that second direction.

18. A method according to claim 15 in which the source package has a second extent perpendicular to the first extent, and the first and/or second extent of the source package during the at least 10 seconds of use is provided by the actual dimension of the source or sources in that direction.

19. A method according to claim 15 in which the extent of the source package during the at least 10 seconds of use is provided by oscillating a source or sources through that extent, the source or sources having an actual dimension in that direction less that the extent.

20. A method according to claim 15 wherein the source includes a plurality of individual sources provided in the container, the plurality of sources being a number greater than 10.

21. A method according to claim 15 in which each of the individual gamma sources emits the same gamma emissions, in terms of their energy, energies or range of energies.

22. A method according to claim 15 in which the level of emissions from each of the individual sources is within 10% of one another.

23. A method according to claim 15 in which the level of emissions for the one or more individual gamma emitting sources is substantially consistent from all directions, at least in all directions perpendicular to the axis on which the sources are aligned.

24. A method according to claim 15 in which the individual source or sources are provided with an end face at both ends of the extent in the first direction, one or both of the end faces of one or more then sources being planar and/or parallel to one another.

25. A method according to claim 15 in which the gamma emitting source(s) have end faces, both of the end faces of one or more of the individual source(s) being perpendicular to the axis of the source.

26. Apparatus for checking instrument performance and/or for modelling instrument performance, the instrument investigating gamma emissions from a fuel rod, the instrument comprising a detector to measure emissions from one or more radioactive sources, a collimator provided between the emission source and the detector, the collimator and detector defining an operating axis, the detector producing signals upon detecting the emissions, the signals being fed to a signal processor, the signal processor providing a measured indication of a characteristic of the source package;

the apparatus comprising a mount for holding a gamma source package and means for supporting the mount, the mount being moveable relative to the instrument in a first direction perpendicular to the operating axis and in a second direction perpendicular to the operating axis the mount providing the source within a location relative to the collimator, that receives a fuel rod during investigation.

27. An apparatus as recited in claim 26, wherein the measured indication provided by the signal processor is a count.

28. An apparatus as recited in claim 26, wherein the first plane is horizontal and the second plane is vertical.

29. A method of investigating the response of an instrument for investigating gamma emissions from a fuel rod using a gamma source package, the method comprising:

providing a source package on one side of a collimator, the source package being provided within a location, relative to the collimator, that receives a fuel rod during investigation, the collimator including an aperture;

providing a detector on the other side of the collimator relative to the source package, the collimator and detector positions defining an operating axis for the instrument;

moving the position of the source package relative to the collimator with the response of the detector being measured for two or more of those different positions of the source package;

the aperture in the collimator having a first dimension measured in a first direction perpendicular to the operating axis; and the source package comprising one or more individual gamma emitting sources provided in a container, in use the individual source(s) having a maximum overall extent in the first direction, the maximum overall extent, during at least 10 seconds of use, being two or more times the first dimension of the collimator in that first direction.

30. A method according to claim 29 in which the investigation is used to check the instruments performance, the instrument being checked using the gamma source package, one or more investigative measurements on unknown fuel rods then being conducted, then determining the instrument's response to the gamma source package, a consistent response to the gamma source package being indicative of consistent instrument performance during the measurements.

31. A method according to claim 29 in which the method is used to model the field of view of the detector.

32. A method according to claim 29 in which the method is used to model variation in detection of emissions by the detector for different positions within the field of view.

33. A method according to claim 29 in which the gamma source package is moved between different positions in a horizontal plane and/or between different positions in a vertical plane.

34. A method of investigating the response of an instrument for investigating gamma emissions from fuel rods to gamma emissions using a source package, the method comprising:

providing a source package on one side of a collimator, the source package being provided within a location, relative to the collimator, that receives a fuel rod during investigation of a fuel rod, the collimator including a single aperture, the aperture in the collimator having a first dimension measured in a first direction perpendicular to the operating axis;

providing a detector on the other side of the collimator relative to the source package, the collimator and detector positions defining an operating axis for the instrument; and moving the position of the source package relative to the collimator substantially along a direction, the direction lying perpendicular to the operating axis and to the direction of the first dimension, the response of the detector being measured for two or more of those different positions of the source package;

the source package comprising one or more individual gamma emitting sources provided in a container, in use the individual source(s) having a maximum extent in the first direction, the maximum extent, during at least 10 seconds of use, being two or more times the first dimension of the aperture in that first direction, such that unquantifiable movement of the source along the direction of the first dimension does not affect the emissions of the source package measured by the detector.

* * * * *

UNITED STATES PATENT AND TRADEMARK OFFICE
CERTIFICATE OF CORRECTION

PATENT NO. : 6,664,539 B2
DATED : December 16, 2003
INVENTOR(S) : Chesterman et al.

It is certified that error appears in the above-identified patent and that said Letters Patent is hereby corrected as shown below:

Title page,
Item [56], References Cited, OTHER PUBLICATIONS, after "FAMOS FUEL Assembly Monitoring System, product information, NUKEM" change "GmcH" to -- GmbH --

Column 2,
Line 50, after "sources" change "maybe" to -- may be --
Lines 58-59, change "energy energies or range of energies" to -- energy, energies, or range of energies --
Line 64, after "individual" change "sources" to -- source --

Column 3,
Line 43, before "clylinder" insert -- a --
Line 62, change "dimension" to -- dimensions --

Column 5,
Aline 61, change "n" to -- in --

Column 10,
Line 18, after "instrument" change "responses" to -- responds --

Column 12,
Line 12, change "that" to -- than --
Line 18, after "positions" insert -- in --
Line 22, change "ensure," to -- ensures, --

UNITED STATES PATENT AND TRADEMARK OFFICE
CERTIFICATE OF CORRECTION

PATENT NO. : 6,664,539 B2
DATED : December 16, 2003
INVENTOR(S) : Chesterman et al.

It is certified that error appears in the above-identified patent and that said Letters Patent is hereby corrected as shown below:

Column 13,
Line 27, change "5 mCi." to -- 5mSi. --

Signed and Sealed this

Tenth Day of August, 2004

JON W. DUDAS
*Acting Director of the United States Patent and Trademark Office*